Patented July 4, 1944

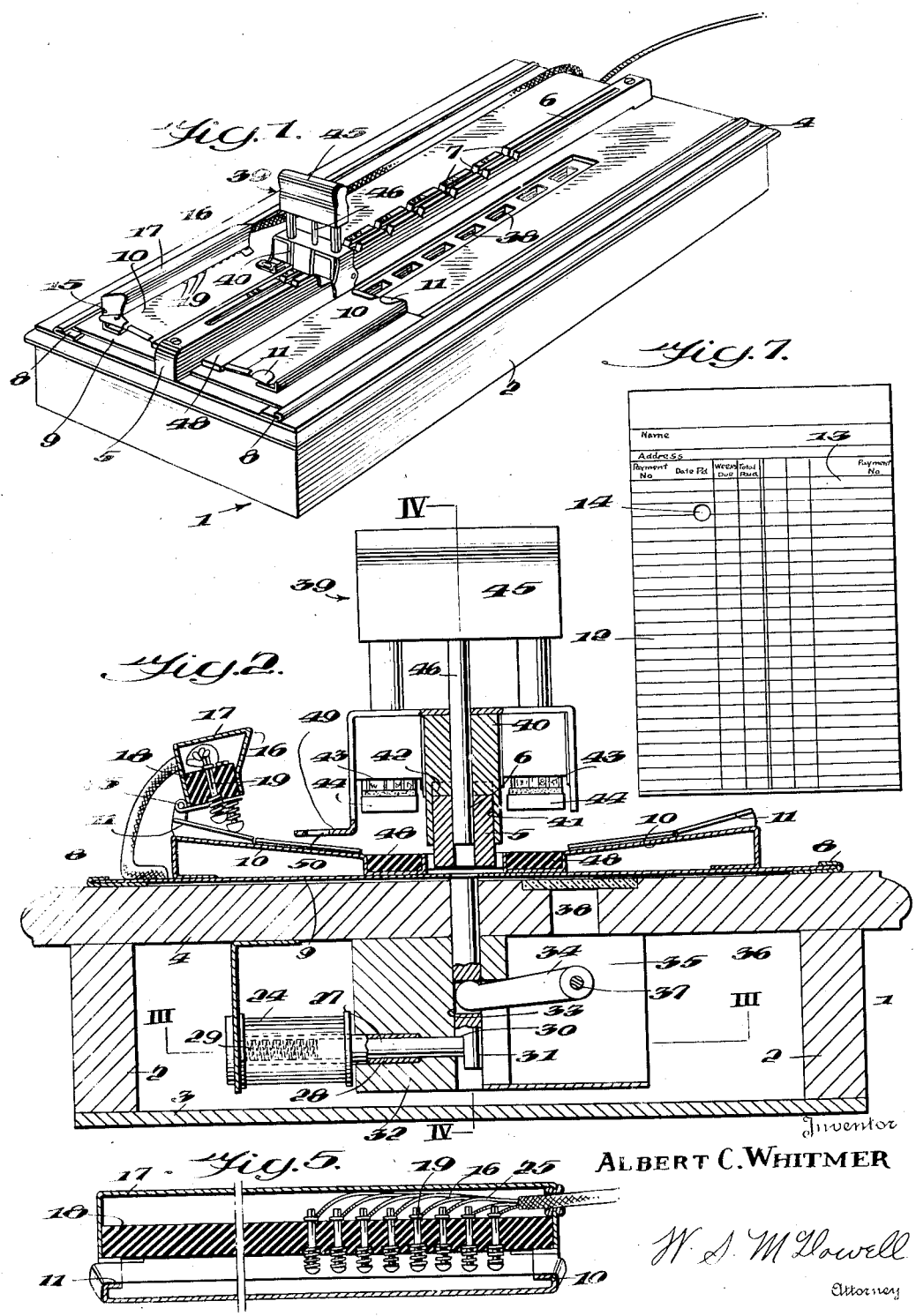

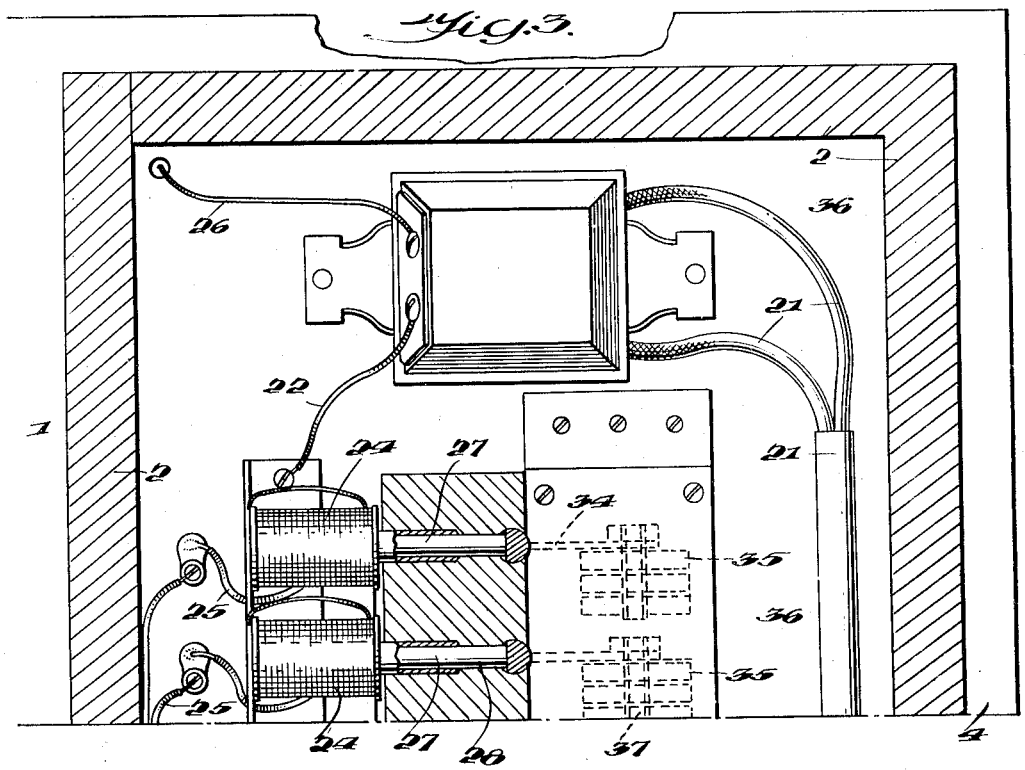
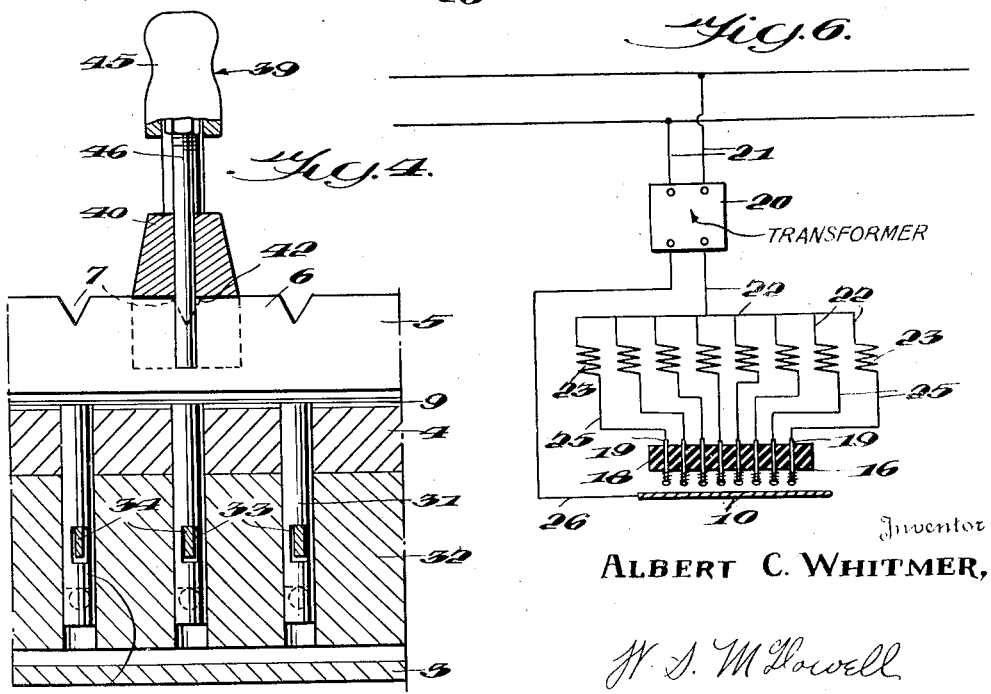

2,352,817

UNITED STATES PATENT OFFICE 2,352,817

MACHINE FOR RECORDING AND REGISTERING BUSINESS TRANSACTIONS

Albert C. Whitmer, Columbus, Ohio

Application May 23, 1941, Serial No. 394,934

5 Claims. (Cl. 234—2)

This invention relates to apparatus for recording and registering business transactions, having particular reference to a novel machine for facilitating an accurate recording of deposits or payments on appropriate record sheets or cards as well as totalizing the number or amount of such payments over a given period.

While possessing more general application, the present invention aims to provide apparatus adapted for use by financial institutions operating so-called Christmas or Vacation Clubs. Such clubs offer a plan of systematic saving in which the members at stated intervals pay predetermined amounts of money, so that at the end of a year or other period, a sizeable fund is available to each member or depositor. While such systems encourage savings, they require considerable record keeping by the bank or other financial institution sponsoring the same.

In conducting such systems, the depositor is usually given a card, the bank keeping a duplicate thereof, bearing the depositor's name and followed by a series of blanks in which entries are made to indicate payments. Whenever a payment or deposit is made, the date thereof is customarily stamped on both the bank and depositor's cards. With this system, it is difficult for the sponsoring institution to ascertain quickly and accurately the amount of such deposits over a given time, or the number of the deposits, or the amount or number of deposits of a given unit value, such as 25¢, 50¢ or $1.00.

The present invention has for its object the provision of a machine by which, when a deposit is made, the entry date, or other recording indicia may be simultaneously recorded on both the depositor's and bank record cards, and wherein through the operation of so recording, totalizing registers are actuated to provide visual indications of the amount or number of such deposits or transactions.

Since most of the "saving club" systems involve periodic payments of different monetary denominations, the present invention provides a machine having a plurality of totalizing registers, the latter corresponding in number to the different payment denominations. In order to preclude erroneous operation of these independent totalizing registers, it is a further object of the invention to provide a novel electrically actuated locking or control mechanism by which the several registers are normally locked or held against operation, and wherein but one register may be released with each recording operation, the release depending upon certain physical features of the entry-receiving cards, and wherein each card, representing a payment of determined value differs from that of other cards having other denominational values.

A still further object of the invention resides in the provision of deposit entry cards or sheets for use in connection with the apparatus, the said cards or sheets being provided with openings, notches, or slots, termed perforations, the locations of the perforations on the cards being varied for cards employed in effecting deposit of sums of different denominations, that is, the location of an opening in a card requiring a 25¢ deposit is offset or differently positioned from that of a card requiring a weekly deposit of 50¢, whereby through this system, spaced electrical contacts, carried by the machine, are permitted to pass through said perforations to complete electric circuits employed in releasing for operation the totalizing registers.

A still further object resides in the provision of a machine of the character set forth wherein is employed a movable manually actuated recording stamp to record entries on the depositor's and bank's records, the construction of the machine being such that recording operation of the stamp may only be effected when a cooperating totalizing register is released for operation.

For a further and more detailed understanding of a preferred embodiment of this improved recording machine, reference is to be had to the following description and the accompanying drawings, wherein:

Fig. 1 is a perspective view of the machine;

Fig. 2 is a vertical transverse sectional view taken therethrough;

Fig. 3 is a horizontal sectional view taken through the base of the machine on the plane indicated by the line III—III of Fig. 2;

Fig. 4 is a vertical longitudinal sectional view on the line IV—IV of Fig. 2;

Fig. 5 is a vertical sectional view disclosing the circuit-completing contacts;

Fig. 6 is a diagrammatic view illustrating the electrical circuits used by the machine;

Fig. 7 is a plan view of one of the entry-receiving cards used in connection with the machine.

Referring more particularly to the drawings, the numeral 1 designates a cabinet of the machine, said cabinet consisting of vertical side walls 2, a removable bottom panel 3 and a top 4, the latter constituting a table.

Mounted on the upper surface of the table 4 and extending longitudinally and centrally thereof is a stationary guide bar 5. This bar is formed with a longitudinally extending slot 6, and the upper surfaces of the bar, as shown in Figs. 1 and 4, are provided at spaced intervals with a series of stamp-positioning notches 7. Usually, these notches are numbered to indicate deposits of different denominational values, such, for example, as 25¢, 50¢, $1.00, $2.00 or the like.

Also, mounted on the upper surface of the table 4, and extending longitudinally thereof, are stationary sheet metal guide strips 8 which receive therebetween for longitudinal sliding movement a sheet metal plate 9. Mounted on the plate 9 for movement in unison therewith are card holders 10. These holders have their ends formed with guide lips 11 in order that said holders may removably receive entry-receiving cards 12 of the type shown in Fig. 7. In the system employed in connection with the present improved machine, a card, such as is shown at 12, is given to each depositor and a duplicate thereof is retained by the bank or other financial institution sponsoring the system. The card may contain blanks for the reception of the name and address of the depositor and, in addition, a series of blanks, usually fifty in number, in order that weekly deposits may be made by the holder of the card and the date of such deposits stamped on the blanks, indicated at 13, for that purpose. In accordance with this invention, each card is provided with a perforation as indicated at 14. By the term "perforation," the same is meant to include not only round openings of the character shown in Fig. 7, but also slots, notches or the like.

For a card on which a 25¢ deposit is to be made every week, or other stated period, the perforation shown at 14 will be disposed in the same position, whereas another card requiring, for example, a 50¢ deposit, the perforation therein will be offset with respect to that on the 25¢ card or in a different position. This holds true throughout the entire set of cards employed for the deposit of money units of different denominations, the purposes for which will hereinafter appear.

Pivotally mounted as at 15 on one of the holders 10 is a switch member 16. This member may comprise a casing 17 in which is received a bar 18 of insulating composition. Carried by this bar is a series of electrically spaced, spring-pressed contacts 19. The switch member 16, by spring action, normally assumes the position, shown in Fig. 2, in which the contacts 19 are maintained in spaced relation from the metallic holders 10. However, when one of the cards 12 is positioned in the holder on which the switch member is supported, and the switch member is rocked about its pivot 15 by manually depressing the same, one of the contacts 19 which is in registration with the perforation 14 of the card, will be caused to pass through the perforation and engage directly with the metallic holder 10. An electrical circuit to be described is thereby completed which is used in controlling the operation of the machine. It will be seen that the other contacts 19 will be prevented from contacting with the holder 10 by the interposition of the imperforate portions of the card, so that during each given operation of the machine but one contact or circuit will be established.

Arranged within the cabinet 1 is a transformer 20, the primary leads 21 of which may be connected with any suitable source of current supply, such as a commercial lighting circuit. The secondary side of the transformer is connected by means of wires 22, joined in multiple or parallel order with a series of solenoid field windings 23, the solenoids, shown at 24, or other equivalent electromagnetic devices, are mounted within the cabinet. From each of the solenoid windings 23, a wire 25 extends to an associated contact 19.

It will be seen that the secondary circuit or circuits of the transformer may be completed by moving the switch member 16 so that one of the contacts will pass through the perforation of a card, allowing the contact so passing to directly engage with the holder 10, the latter being connected with the wire 26 which, as shown in Fig. 6, extends back to the second terminal on the secondary side of the transformer. If for any reason two or more of the contacts 19 should happen to engage with the holder 10 at the same time, the distribution of current to two or more of the windings 23 will result in such a weakened flow as to be insufficient to attract the cores or armatures 27 of the energized windings. This feature, as well as the perforation in the card, assures the operator of the machine that but a single solenoid will be effectively energized for any given operation.

The armature 27 of each solenoid is slidably mounted in a guide opening 28, and when the solenoids are deenergized, a coil spring 29, carried by each solenoid, forces the coacting armature outwardly so that its outer end will be maintained in contact with a shoulder 30 provided on the lower end of each of a plurality of depressible register-operating plungers 31. These plungers are slidably mounted in vertical openings provided in the top 4 of the cabinet and in an underlying supporting block 32. Each plunger is provided with a slot 33, in which is received the outer end of an arm 34. Each of the plungers thereof is employed to operate a totalizing register 35, there being a series of such registers mounted in independent order within the compartment 36 of the cabinet 1. Each register carries one of the arms 34 in connection with its operating shaft 37, said arms being spring-pressed in order to maintain their associated plungers 31 in the normally elevated positions disclosed in Fig. 2. When so elevated, the plungers are held against sliding movement in a downward direction by the solenoid armatures 27. When a particular solenoid is energized, by the means previously described, the armature associated therewith is withdrawn from engagement with its complemental plunger 31, so that the latter may be depressed to actuate its associated register 35. The registers 35 may be of any conventional design, the totalizing wheels of which, shown in dotted lines, are viewable through glazed openings 38 provided in the top of the cabinet 4.

To simultaneously record deposit entries on the card records 12, use is made of a dual dating stamp 39. This stamp includes a frame 40, which is channeled as at 41 so that it may be slidably received on the guide bar 5, said frame including a V-shaped extension 42 in order that the stamp may be positioned in any one of the notches 7 and thereby vertically aligned with any one of the plungers 31. The frame of the dating stamp carries the usual type 43 and inking pads 44. Also the frame of the stamp includes the customary actuating head 45 which, when depressed against spring action, moves the pads 44 to uncover the type 43, allowing the latter to be sufficiently depressed to produce the desired impression simultaneously on the entry-receiving blanks 13 of the cards 12 positioned in the holders 10. One of the novel features of the stamp 39 is the provision of a rod shown at 46. This rod is carried by the head 45 and slidably extends through an opening 47 in the frame 40, the lower end of the rod being normally received within the slot 6 of the guide bar 5. By this construction, effective operation of the stamp to record entries on the cards 10 cannot be executed, unless the plunger 31 in vertical registration therewith has been released by the energizing of an associated solenoid 24, thus preventing erroneous use or actuation of the dating stamp. While this stamp has been referred to as a dating stamp, it will be understood that the type thereof may contain any suitable indicia. The holders 10 are grooved to receive cushioning strips 43, the latter being disposed in alignment with the type 43 in order to provide a yieldable base for the type when in engagement with the record cards.

In view of the foregoing, it is believed that the use, operation and advantages of the machine will be quite readily understood. When a depositor makes a payment, his deposit card is placed in the holder 10 at one side of the bar 5 while the bank's card for said depositor is placed in the holder at the other side of the bar. These cards are so printed that the entry-receiving blanks thereon will be disposed immediately adjacent to the bar 5 when the cards are properly positioned within the holder. The dating stamp 39 is then adjusted longitudinally of the bar while the V-shaped extension 42 thereof is positioned in one of the notches 7 corresponding with the denominational payment to be entered on the cards. That is, if the deposit should be of the value of $1.00, the stamp is moved to engage with the notches 7 of that particular value. The holders 10 may then be longitudinally adjusted in order that the particular blank 13 of said cards which are to receive the entry will be aligned with the stamp.

This second alignment may be conveniently effected by providing the frame 40 at its lower end with an offset extension 49 in which is formed a sight opening 50. By sliding the plate 9 relative to guide strips 8, the proper blanks 13 on said card may be registered with the stamp when the latter is seated in its proper notches. When such registration has been effected, the switch member 10 is manually depressed against spring resistance, and due to the presence of the perforations 14 in said cards, a proper contact 19 will engage with the metallic holder 10, thereby completing an electrical circuit which will energize the solenoid 24 with which the stamp 39 has been registered. The armature of the energized solenoid is then withdrawn from engagement with its associated plunger 31, permitting the head 45 of the stamp to be depressed, and simultaneously stamping record indicia on both the depositor and bank cards, as well as depressing the released plunger 31 to effect a single operation of the associated register 35. It will be seen that if through any reason, the stamp was not positioned in the proper notch of the bar 5, the head 45 of the stamp could not be sufficiently depressed to cause the type 43 thereof to print on the cards 12, or to cause the actuation of the register devices.

The interlocking mechanism thus provided assures the accuracy of the machine and eliminates clerical mistake or error. At the end of a business day, or any other period, the registers provided by the machine enable the user of the machine to ascertain promptly the number and amounts of deposits entered or registered, this being true for each denominational value and also for a total of all denominations.

Where the term card is used herein, as descriptive of the elements 12, it will be understood that this term is employed in a general sense, and such devices as books, leaves or sheets are to be included within the purview thereof.

What is claimed is:

1. A machine for entering and registering business transactions comprising a plurality of relatively independent totalizing registers, a locking member normally holding each of said registers against operation, an electromagnetic device associated with each of said members and registers, a movable switch member, a plurality of independent contacts carried by and movable in unison with said switch member, a holder for the individual removable reception of variously perforated cards, said holder being aligned with said switch member so that the perforation in the card held thereby is registered with one of said contacts, circuit means for said contacts independently closable by the passage of its contact through a perforation in such a card to energize a corresponding one of said electromagnetic devices and thereby release for operation one of said registers, a recording stamp alignable with a register and having a movable plunger, said stamp being adapted to register with a card supported in said holder to produce an entry record thereon, and means coacting with the plunger of said stamp to admit of recording actuation of the stamp and the released complemental register aligned therewith.

2. A machine for entering and registering business transactions comprising a table, a slotted guide extending longitudinally of the table, an entry-recording stamp mounted on said guide for longitudinal sliding movement, said stamp being provided with a movable member disposed in the slot of said guide, holders for the reception of removable entry-receiving cards arranged at each side of said guide and adjustable longitudinally with respect thereto, said cards having variously located perforations formed therein, a manually operated switch on one of said holders carrying a series of electrically spaced contacts, a series of electromagnetic devices beneath said table, each of said devices being selectively energized by the passing of its complemental contact through a perfection in the record card contained in the switch-carrying holder, a plurality to totalizing registers, and means released by the energizing of the electromagnetic device complemental to the perforation-entering contact for effecting actuating movement of said stamp and the register aligned therewith.

3. Apparatus for registering and recording business transactions comprising a base, a plurality of relatively independent totalizing registers on said base, a locking member for each register operative normally to maintain its cooperative register against actuation, an electromagnetic releasing device for each locking member, a holder slidably mounted on said base, said holder being formed for the individual and removable reception of entry-receiving cards having variously located perforations, a switch member movably supported on said holder, a plurality of independent contacts carried by said switch member, a plurality of independently energized electrical circuits, each of said circuits having included therein one of said electromagnetic devices and one of said contacts, whereby the passage of one of said contacts through an aligning perforation in a card contained within said holder effects the closure of the circuit connected with the perforation-entering contact, causing the energizing of the electromagnetic device complemental thereto, the withdrawal of the locking member of the energized device and release of the complemental register, a recording stamp movable into alignment with the released register and the card contained within said holder, and manually operated means formed with said stamp for actuating the released register and said stamp.

4. Apparatus for recording and registering business transactions comprising a table, a holder for the reception of a pair of entry-receiving cards, means for supporting said holder for sliding movement on said table, at least one of said cards having a distinctively located perforation formed therein, a plurality of independently actuatable totalizing registers, locking means normally holding said registers against operation, electrically operated retractible means for releasing said registers, a manually operated switch carried by said holder having a multiplicity of spaced contacts, said switch being movable to cause said contacts to engage with said perforated card so that the contact disposed in registration with the perforation in said card will pass therethrough and thereby complete an electrical circuit to actuate said retractible means and release a particular register, an entry printing member slidably carried by said table to occupy different positions of alignment with respect to said registers, said printing member being normally spaced from the cards contained within said holder, and means carried by said printing member and actuatable upon the release of a given register aligned therewith to cause said member to simultaneously print entries on said cards and effect one complete actuating cycle of the released register in alignment therewith.

5. Apparatus for recording and registering business transactions, comprising a table, a longitudinally extending guide arranged on said table, a printing stamp movable longitudinally of said guide, said stamp having dual printing elements arranged on each side of said guide, a holder for the reception of a pair of removable record-receiving cards, said holder being adjustable longitudinally of said guide to bring corresponding entry-receiving blanks provided on said cards in registration with the printing elements of said stamp, at least one of said cards having a distinctively located perforation formed therein, a manually operated switch movably carried by said holder, said switch including a plurality of spaced contacts, one of said contacts depending upon the location of the perforation in said card being adapted to pass through said perforation to complete an electrical circuit, means responsive to the completion of said circuit to release said stamp to permit its printing elements to be brought into contact with the entry-receiving blanks of said cards, a plurality of totalizing registers with which said stamp is selectively alignable by movement on said guide, and means operable to effect the actuation of a register aligned with said stamp when the latter is released to effect a printing operation on said cards.

ALBERT C. WHITMER.